United States Patent [19]
Schlenker et al.

[11] 3,926,532
[45] Dec. 16, 1975

[54] QUICK RELEASABLE COUPLING

[75] Inventors: Harold Oscar Schlenker, Aberdeen; Fay W. Glover, Frederick, both of S. Dak.

[73] Assignee: Safeguard Automotive Corporation, Aberdeen, S. Dak.

[22] Filed: Aug. 5, 1974

[21] Appl. No.: 494,792

[52] U.S. Cl. .............................. 403/322; 403/328
[51] Int. Cl.² ............................................ F16B 7/00
[58] Field of Search .......... 403/324, 325, 317, 328, 403/322; 285/314; 279/71

[56] References Cited
UNITED STATES PATENTS

| | | |
|---|---|---|
| 684,594 | 10/1901 | Austin.................................... 279/71 |
| 1,740,377 | 12/1929 | Snyder et al........................... 279/71 |
| 2,361,827 | 10/1944 | Dowell.................................. 285/314 |
| 3,351,359 | 11/1967 | Ferraris.............................. 285/314 X |
| 3,480,310 | 11/1969 | McElwain.......................... 403/322 |

*Primary Examiner*—Andrew V. Kundrat
*Attorney, Agent, or Firm*—Merchant, Gould, Smith, Edell, Welter & Schmidt

[57] ABSTRACT

A quick release mechanism for maintaining axial engagement in couplings for the transmission of mechanical energy of rotation, where a male drive member telescopes with a female driven member. Pins are radially moveable in passages in the female member, and camming surfaces surrounding that member act on the pins to force them, against compression springs, to protrude into an annular groove in the male member, and thus lock the members against axial movement. Additional spring means are provided to normally maintain the camming surfaces in the position in which the pins so protrude, but can be overcome manually to enable the coupling to be engaged and disengaged.

1 Claim, 5 Drawing Figures

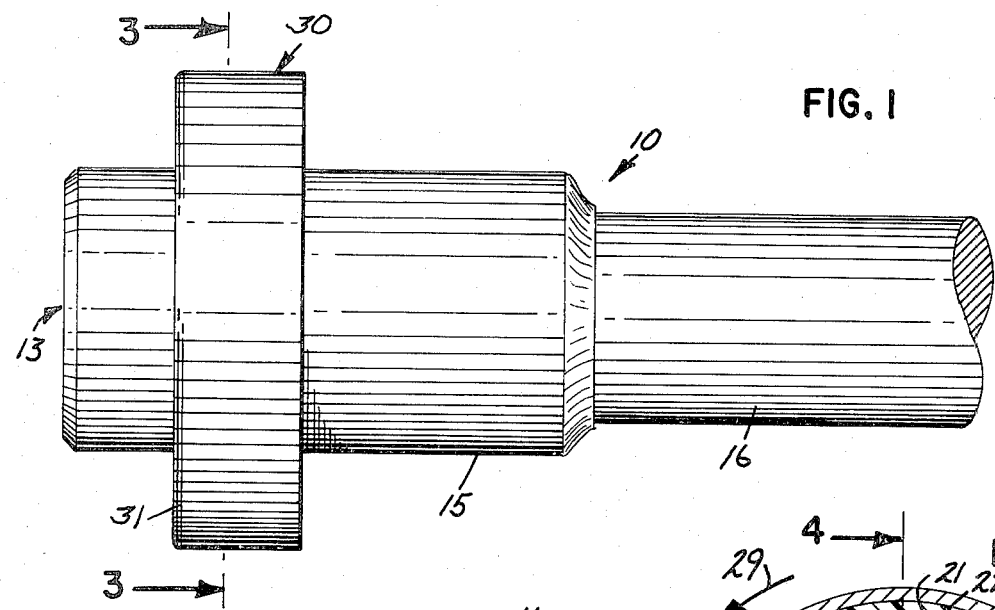
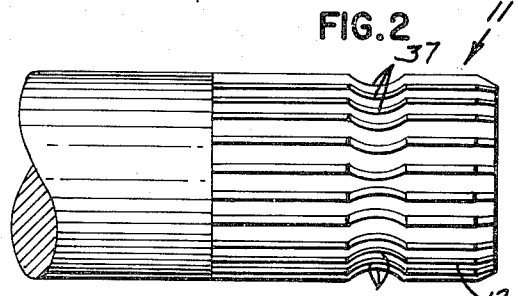
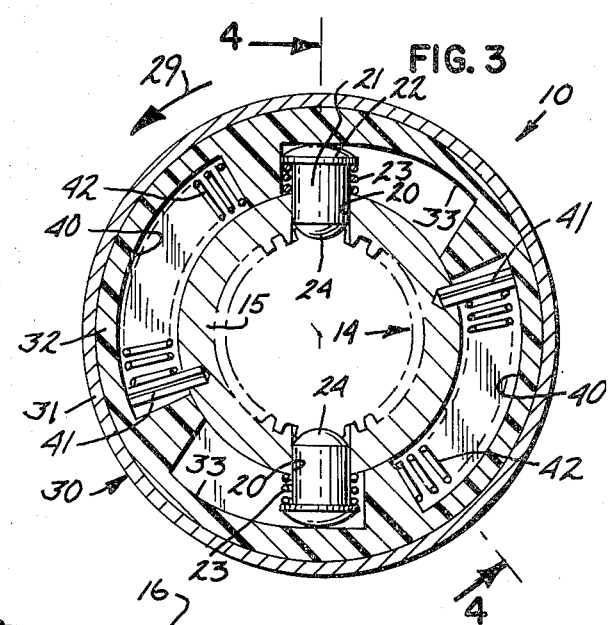
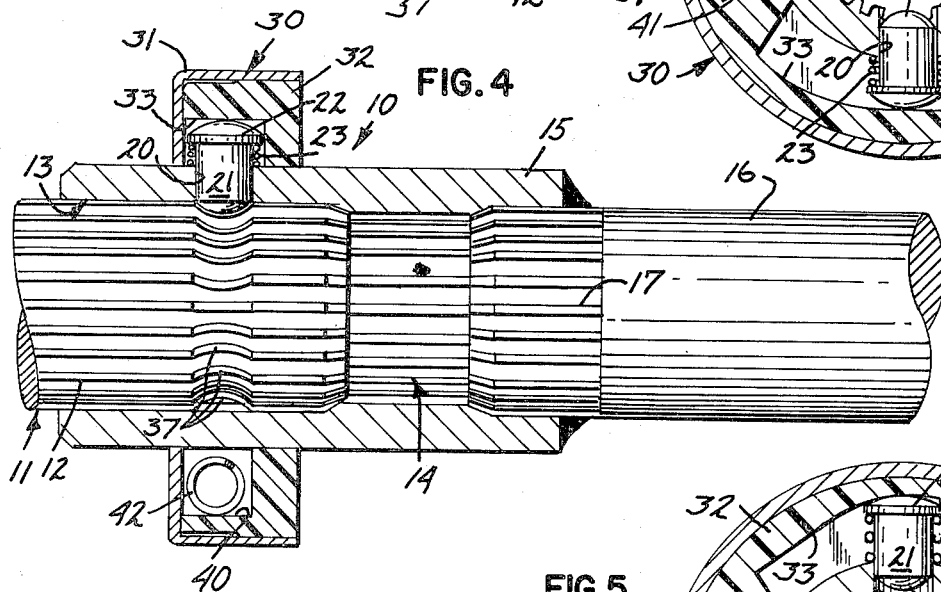
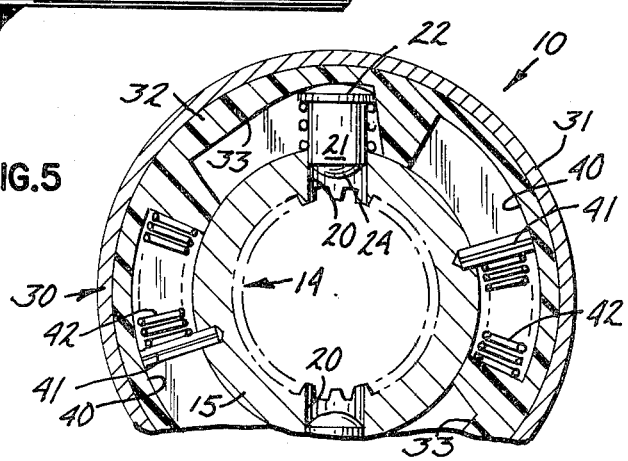
FIG. 1
FIG. 2
FIG. 3
FIG. 4
FIG. 5

QUICK RELEASABLE COUPLING

BACKGROUND OF THE INVENTION

This invention relates to the field of mechanics, and more particularly to quickly releasable means for maintaining the axial relation of a pair of members one telescoped within the other, and finds a principal use in arrangements where mechanical power of rotation is transmitted from a driving shaft to a driven shaft.

It is frequently desirable that a first member be inserted into a second member, and that the connection, while mechanically secure, be readily releasable. The problem often arises in the transmission of mechanical power, by interfitting male and female splines or equivalent means, where power is to be transmitted from a single source to any of the plurality of mechanisms or attachments.

An excellent example of this is to be found in the field of agricultural machines, where a farmer's tractor is provided with an externally splined power takeoff for receiving the internally splined drive shafts of an assortment of implements, as they are drawn by the tractor. Although the actual draft of the implement takes place through sturdy connections other than the power takeoff, it is still necessary that the connection by which the rotary power is transmitted to the implement be prevented from inadvertent separation.

A well known way of accomplishing this is simply passing a cotter key, bolt, or similar pin through aligned holes in the axially telescoped shafts. This is fundamentally successful, and may incidentally assist in the transmission of power as well, but it is not very convenient, particularly at busy times when it is necessary to connect and disconnect several implements, or a repeating sequence of them, in a short time. Moreover many serious and sometime fatal accidents have been caused when the closing of an operator catches in the end of a rotating protuberance of this sort, drawing the operator into the machinery.

SUMMARY OF THE INVENTION

The present invention comprises an arrangement for quickly, easily and conveniently engaging and releasing a pair of telescopically interfitted shafts, and particularly for so connecting the male power takeoff shaft of a tractor with female sockets on driven implements. The tractor shaft has a standard circular groove cut in its male splines at a standard location spaced from its end. Each implement socket includes an external manually rotatable annular member, which is resiliently maintained in a first position where lock pins project inwardly, to be received in the annular groove on the tractor shaft. Manual rotation of the annular member withdraws the pins, allowing the socket to be withdrawn from the shaft. The change thus requires no tools and involves no movable parts to be dropped or mislaid. The annulus moreover has no projection or protrusion, and therefore cannot injure the operator or catch in his clothing, thus providing an important safety feature.

It is a principal object of the invention to provide a new and improved mechanism for connecting and releasing the members of a mechanical coupling. Another object is to provide such a mechanism which is convenient, safe, and quick in operation. Another object is to provide such a mechanism which is conveniently operated manually without tools or loose parts, and which is resiliently urged into its engaged or operative position.

A more specific object of the invention is to provide a coupling for farm implements in which an inwardly splined driven member has radially movable pins and a surrounding smooth annular member which includes means for normally forcing the pins inwardly to engage a groove in the externally splined shaft of a tractor power takeoff, and which further includes means actuated by manual rotation of the annular member for withdrawing the pins outwardly to release the drive member axially from the shaft.

Various other objects, advantages, and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing

FIG. 1 shows a driven member according to the invention;

FIG. 2 shows the end of a driving member or power takeoff shaft for use with the structure of FIG. 1;

FIG. 3 is a transverse section, taken along the line 3—3 of FIG. 1, showing the coupler in its normal or engaged position;

FIG. 4 is a longitudinal sectional view taken along the line 4—4 of FIG. 3 and showing the two members coupled in power transmitting relation; and FIG. 5 is a partial view like FIG. 3 but showing the mechanism in its disengaged or released position.

DESCRIPTION OF THE PREFERRED EMBODIMENT

As shown in the drawing my invention is used in connection with a power transmission coupling including a driving member 11 and a driven member 10. The end of member 11 is externally splined at 12. Member 10 is hollow with an open end 13 and an internal spline 14 which mates with spline 12 when the members are telescoped axially as shown in FIG. 4. For convenience in constructing member 10 it may be formed by welding an internally splined collar 15 on the end of a shaft 16 which may indeed be externally splined for a short distance, as indicated at 17, to give greater torsional strength to the joint.

A plurality of radial passages 20 extend through the wall of member 15 at locations displaced from open end 13, and a plurality of pins 21 are slidably received in these passages. Outwardly the pins are headed as at 22, and compression springs 23 act between member 15 and the heads 22 of the pins to urge the latter outwardly. The inner ends of the pins have spherical configurations as shown at 24.

An annular member 30 is mounted for rotation on member 10 at the location of pins 22, and may comprise a cap 31 pressed or otherwise secured on a body 32. Body 32 is formed with a plurality of camming surfaces 33 which engage the heads of pins 21. Member 30 is outwardly configured to be readily grasped for manual rotation, about the axis of members 10 and 11, between a first position shown in FIG. 3 and a second position shown in FIG. 5. In the first position camming surfaces 33 act on the heads 22 of pins 21 to force the pins radially inwardly in passages 20, comprising springs 23 and causing spherical tips 24 to project into the space defined by the internal spline 14 in member 10. In the second position of member 30 the camming surfaces allow pins 21 to move radially outward under the action of springs 23 until the spherical tips are drawn into passages 20 and do not project into the space defined by the internal spline.

The normal direction of rotation of member 10 is shown by the arrow 29 in FIG. 3.

The splines 12 at the end of member 11 are machined away in curves 37 to which the ends 24 of pins 21 correspond, so that the pins may enter the resulting annular groove and thereafter oppose any axial movement between members 10 and 11.

I have found it desirable to establish the condition of member 10 as normal in which camming surfaces 33 of annular member 30 are forcing pins 21 inwardly. To establish this condition, and to automatically maintain it, body 32 is provided with further, arcuate passages 40 adjacent to member 10, and a plurality of pins 41 are provided which project outwardly from member 10 into passages 40. A plurality of compression springs 42 are positioned in passages 40, one end of each spring bearing against the wall of the body at the end of the passage, and the other end bearing against one of pins 41. Under the action of these springs annular member 30 is rotated, clockwise in FIG. 3, until pins 41 positively engage the end walls of passages 40: camming surfaces 33 concurrently force pins 21 inwardly to establish the desired normal condition of the member.

When it is desired to connect or release a member 10 with respect to member 11, annular member 30 is manually grasped and rotated in a counterclockwise direction to the position shown in FIG. 5, compressing springs 42 by pins 41 and allowing springs 23 to expand and withdraw pins 21 into passages 20, so the tips 24 are free from curves 37 and axial movement between members 10 and 11 is possible. When the manual force is removed, the annular member returns to the normal condition as described above.

While the invention has been shown applied to a splined power takeoff embodiment, it will be appreciated that hexagonal or square shafts for example can be used as well, and that if power transmission is not required the invention will operate perfectly well to releasably secure even two circular shafts against relative axial movement.

Numerous objects and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. Means for quickly securing and releasing the axial engagement between a pair of coaxial members, one being hollow and having an open end to receive the other, comprising:

a plurality of radial passages extending through the hollow member at locations displaced from said open end;

a pin slidable radially in each said passage between an inward position and an outward position;

resilient means urging said pins towards said outward positions;

an annular member rotatable about said hollow member at the location of said pins and including camming surfaces operative on said pins in a first rotated position of said annular member to force said pins into said inward positions, and in a second rotated position of said member to enable said pins to be displaced by said resilient means into said outward position;

means carried by said other member for engagement by said pins in the inward positions thereof to oppose axial movement between said members;

and means limiting the extent of rotation of said annular member, including further pins projecting radially outwardly from said hollow member within said annular member, arcuate passages of limited angular and axial extent in said annular member for traversal by said further pins, and further resilient means contained in said arcuate passages and engaging said annular member and said further pins to urge said annular member into the first position thereof, said radial passages and further pins being located alternatively about the axis of said outer and inner members.

* * * * *